(12) United States Patent
Morris et al.

(10) Patent No.: US 6,895,020 B2
(45) Date of Patent: May 17, 2005

(54) METHOD AND APPARATUS FOR PROTOCOL PATTERN IDENTIFICATION IN PROTOCOL DATA UNITS

(75) Inventors: Jerry David Morris, Colorado Springs, CO (US); Vonn Black, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 849 days.

(21) Appl. No.: 09/919,297

(22) Filed: Jul. 31, 2001

(65) Prior Publication Data

US 2003/0026251 A1 Feb. 6, 2003

(51) Int. Cl.[7] ................................................. H04J 3/24
(52) U.S. Cl. ........................ 370/474; 714/715; 375/368
(58) Field of Search ................................ 370/389, 466, 370/474, 497, 509, 514; 714/715; 375/240.26, 368; 709/236

(56) References Cited

U.S. PATENT DOCUMENTS 5,727,036 A * 3/1998 Maertens ..................... 375/368
5,734,429 A * 3/1998 Jung ........................... 370/509
6,463,477 B1 * 10/2002 Fontenot ..................... 709/236
6,654,389 B1 * 11/2003 Brunheroto et al. ... 375/240.26

* cited by examiner

Primary Examiner—Duc Ho
Assistant Examiner—Phuongchau Ba Nguyen (57) ABSTRACT

Method and apparatus for protocol pattern identification in protocol data units (PDUs). Techniques disclosed utilize the concept of stages. Within each stage, a protocol identification apparatus attempts to find a pattern match between the bits of the protocol data unit and the predefined bits of search patterns for a particular layer of protocol encapsulation. Once found the apparatus resets itself and begins the search anew for the next layer of encapsulation. The user is provided the ability to look for a particular pattern in a higher layer protocol without having knowledge of which lower layer protocols were used. Both hardware and software implementations of this apparatus provide for very fast identification of the protocol data units. Information regarding which encapsulations are present in a particular protocol data unit are provided saving software routines time when they process each packet. Also, by informing the apparatus regarding the encapsulation patterns desired, the protocol identification apparatus can filter the protocol data unit at runtime which saves additional software routines from spending time later processing packets that are not needed, and in addition, can save valuable capture buffer space by discarding those protocol data units not of interest.

22 Claims, 6 Drawing Sheets

METHOD AND APPARATUS FOR PROTOCOL PATTERN IDENTIFICATION IN PROTOCOL DATA UNITS

FIELD OF THE INVENTION

The present invention relates generally to the identification, in computer network systems, of packets or frames of data, also commonly referred to as protocol data units (PDUs), with respect to protocols used for their encapsulation, and in addition to the subsequent selection or filtering of the data packets so identified.

BACKGROUND OF THE INVENTION

Modern computer networks comprise interconnected collections of computers. A primary function of such networks is the enablement of information exchange between member computers. As the member computers typically operate autonomously, without control as to when the other computers attempt to transmit information via the network, data is commonly divided into a number of smaller pieces which are then individually transmitted within packets or frames of data. This practice provides more uniform access to the network, as well as the opportunity to retransmit packets in case of interference between the packets of the various computers connected to the network. A given packet comprises that part of the data assigned to it, information defining the format of the packet, as well as other information such as the packet number and the addresses of the sender and receiver of the packet. The format of the data packet is specified via predefined protocols. Data packet formatting is complicated by the fact that networks are structured in layers. Typically data packets are sequentially encapsulated by one network layer after another with each having its own protocol. The composed data packet is often referred to as a protocol data unit (PDU). As a further complication, numerous different protocols are in common use at various layers of the network. While the bit pattern added to any given protocol data unit specifying that a particular encapsulation protocol was used has a length selected from a set of pre-specified lengths, a different protocol may have a length selected from a different set of pre-specified lengths. In addition, unrelated groups of computers using unknown protocols may also be connected to and use the same network.

Network environments are both complicated and dynamic. Thus, a very important activity in managing a network is to analyze the traffic, which it carries. For this purpose a protocol analyzer is used. A protocol analyzer typically attempts to identify those protocol data units that have been encapsulated with various preselected protocols. Previous solutions for such identification have relied upon using filters, or pattern comparators, which identify predefined combinations of protocols of interest. Any given combination of protocols forms a bit pattern which comprises sub-patterns of those protocols used to encapsulate the packet, with each of these sub-patterns beginning at specified fixed offsets within the protocol data unit. Only those protocol data units matching the anticipated pattern combination is identified as fulfilling the match criteria by any given filter. Such a filter is referred to as a "flat filter". A salient feature of this technique is that one filter is required for each combination of protocols of interest.

Thus, this approach has the disadvantage that a large number of filters, in reality bit pattern comparators, may need to be employed. As an example, if the user is looking for protocol data units that contain voice traffic over the protocol xGCP, currently 13 flat filters would be needed. In addition, if the user does not know which of three different local area network (LAN) encapsulations is used, three sets of 13 filters or a total of 39 flat filters would be needed. Further, if the user does not know which of six different wide area network (WAN) encapsulations is used to carry the LAN traffic, he would need to set up six sets of 39 filters for a total of 234 filters. In such situations, hardware resources become prohibitively expensive and complicated. As such, providing them becomes impractical.

Also in a typical network situation, there could be data flowing between literally hundreds of different nodes of which the user may be interested in capturing data from only two of these. Due to the speed of modern networks and the limited memory space of typical modern network analyzers, the buffer space allocated for protocol data unit capture can be overrun quickly. The majority of the protocol data units captured could be from nodes for which the user has no interest. As an example, if the user knows the internet protocol (IP) address of two nodes of interest and would like to only capture data between these two nodes, unless he has detailed knowledge of the network it would be impossible for him to identify the IP addresses in the protocol data units unless he has at his disposal the numerous flat filters mentioned above.

Thus there is a need for better techniques for identifying combinations of multiple protocols used to encapsulate protocol data units. In particular, there is a need for a system capable of such identification, with related packet filtering, that does not require the large numbers of filters that present systems do.

SUMMARY OF THE INVENTION

The present patent document relates to novel methods for the identification and related filtering of variable-length, multi-layer encapsulated protocol data packets in computer network systems. Previous solutions for such identification and related filtering have relied upon using numerous flat filters that each identify a predefined combination of protocols of interest. In many situations, due to the large number of flat filters that may be required, hardware resources can be prohibitively expensive and, as such, providing them impractical.

In representative embodiments, the present patent document discloses techniques for using a protocol identification apparatus in stages to identify and filter computer network protocol data units. In the first stage, the apparatus identifies, via the matching of a set of potential protocol bit patterns with the bits of the protocol data unit, the protocol used for the first layer of encapsulation. The apparatus then attempts to identify the next layer of encapsulation to select via a similar matching with a second set of protocol bit patterns, via information coded into the previous encapsulation protocol, via best guesses encoded into the apparatus based on previous matches, or user guesses encoded into the apparatus. The process then continues until all layers of encapsulation that the user is interested in have been identified. Each such pattern can be of differing lengths. However, once an encapsulation for any given protocol encapsulation layer has been identified, the apparatus knows how far into the protocol data unit to index in order to begin searching for the next protocol pattern. This process can be repeated as many times as needed, within the constraints of a given implementation.

A table look-up method is used so that a number of patterns for any given protocol layer can be easily looked up in parallel and compared. Since the apparatus knows where in the protocol data unit the end of the last matched protocol pattern occurred, it knows where to begin the next pattern matching attempt.

The techniques disclosed utilize the concept of stages. Within each stage, the apparatus attempts to find a pattern match between the protocol data unit bits and the predefined pattern bits for a single layer of protocol encapsulation. Once found the apparatus resets itself and begins the search anew for the next layer of encapsulation.

In representative embodiments, the techniques disclosed can be thought of as searching a protocol data unit in stages. Each stage typically has a number pre-assigned to it. The search of the protocol data unit begins, for example, in stage number 0, and as the search by that stage is completed, a new stage is selected based on the results of the current stage search. This process continues until the end of the protocol data unit is reached, or it is determent that no further searching of the protocol data unit is needed.

The bytes of the protocol data unit are searched starting, for example, with byte 0. The stage can be thought of as consuming bytes of the protocol data unit until a pattern is found which causes the stage to end. The next stage then begins consuming bytes where the last stage ended. An optional performance enhancement can be made to this procedure by skipping bytes that do not need to be matched in the pattern. The bytes to be skipped are pre-programmed into a table that is then used by the system to skip the unneeded bytes.

In representative embodiments, the method and apparatus employed for protocol pattern searches at any given stage is used over and over again for each successive stage search. A pre-programmed "pattern lookup table" is used to determine if a particular encapsulation is present in a particular part of a protocol data unit for the current stage. A section of the pattern lookup table, that has been pre-programmed for the current stage number and protocol data unit byte number being searched, are indexed into. In a representative example, this section of the pattern lookup table has 256 entries in it, one for each possible value of the current byte of the protocol data unit. The entry corresponding to the actual value of the current byte of the protocol data unit is read from the table. The value that is read from the pattern lookup table is then AND accumulated into the stage accumulator, which is typically initialized to all ones at the beginning of the stage.

Each bit of this stage accumulator value has a pattern number assigned to it. A pattern is considered to be found if its stage accumulator bit is set and the stage has searched far enough into the protocol data unit to match the whole pattern, as determined from pre-programmed values in an "entry list", which causes a "stage pattern found bit" to be set. In a representative example, the entry list has one entry per pattern comparison that provides information as for example the next skip value and the last pattern comparison for this stage. If a pattern has been found that has been designated to cause a transition to a new stage then the current stage ends, if not then the next pattern lookup table entry is read, assuming we have not reached the end of the protocol data unit.

Based on pre-programmed information regarding the patterns for the current stage, information can be output regarding, what protocol is found, what stage number to go to next, what pattern number (or numbers) are found that are to be used in forming the "stage group results", and in some cases what encapsulation follows the encapsulation just found. The stage group result is the result of the pattern matching for the stages completed. Typically the group result is a bit pattern with a 0 in a bit position representing each preselected group of search patterns for each stage unless a match has been found for that preselected group of search patterns in which case a 1 is placed in the corresponding bit position. The group result can be used to determine whether or not the protocol data unit matches a preselected group of protocols.

When each stage search ends, the bits indicating which patterns were found for the stage are mapped into a "stage group result". This mapping is accomplished by using a number of pre-programmed tables which are referred to herein as clique maps. Each clique map is indexed into based on the current stage number and the bits of the stage patterns found bits assigned to the clique map. Optionally the index into the clique map can additionally be based on a "time slice number", if the number of "stage group result bits" needed is greater than the width of the clique map.

The value obtained from each of the clique maps is OR'd together to form the "stage group results value". Some of the bits from this stage group results can be optionally used to generate any number of stage output results, although other methods can be used to generate the stage outputs. Also, the remaining stage group results bits are used to form a "stage group filter result". The stage group filter result is AND accumulated into the group accumulator, which is initialized to all ones at the beginning of a search of a protocol data unit. Each bit of this group accumulator value has a "group filter number" assigned to it.

A group filter is specified as a preselected set of stages satisfied and within each specified stage only one of the specified patterns for that stage would be found for the stage to be satisfied. On completion of the search of a protocol data unit, a group filter is considered to be found if its group accumulator bit is set and the appropriate stages have searched the protocol data unit. As the result of finding a group filter one or more actions can be taken, as would be the case with a conventional filter design, such as counting, saving the protocol data unit, discarding the protocol data unit, starting or stopping the capture of data, as well as other actions.

Techniques disclosed herein provide the ability to let the user look for something in a higher layer protocol without having to know anything about what lower layer protocols are being used. Also, by informing the apparatus regarding the encapsulation patterns desired, it can identify the encapsulation in the protocol data unit at runtime, which saves additional software routines from spending time identifying the encapsulations in each packet later. Both hardware and software implementations of this apparatus provide for very fast identification of the protocol data units.

In a typical network situation, there could be data flowing between literally hundreds of different nodes of which the user may be interested in capturing data from only two of these. Due to the speed of modern networks and the limited memory space of typical modern network analyzers, the buffer space allocated for protocol data unit capture can be quickly overrun. In previous systems, the majority of the protocol data units captured could be from nodes for which the user has no interest. As an example, if the user knows the internet protocol (IP) address of two nodes of interest and he would like to only capture data between these two nodes, previously unless he had detailed knowledge of the network it would be impossible for him to identify the IP addresses in the protocol data units as he would have to have at his disposal the numerous flat filters mentioned above. However, with the capabilities of the various stages of identification of the present apparatus, he would be able to filter out those protocol data units of interest with only minor additional effort beyond that required for protocol identification.

A primary advantage of the embodiment as described in the present patent document over prior is the dramatic reduction in the large number of pattern comparators required to search for a match with the packet protocol patterns of the protocol data unit. This reduction is provided via the utilization of the concept of stages. An additional advantage is the ability to look for a particular pattern in a higher layer protocol without having knowledge of which lower layer protocols are being used. Also, both hardware and software implementations of this apparatus provide the advantage of very fast identification of the protocol data units. Another advantage is the ability to provide information regarding which encapsulations are present in a particular PDU thus saving software routines time when they process each packet later. And finally, by informing the apparatus regarding the encapsulation patterns desired, the protocol identification apparatus can filter the protocol data unit at runtime which provides the advantages of saving additional software routines from spending time later processing packets that are not needed and valuable capture buffer space by discarding those protocol data units not of interest.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

As shown in the drawings for purposes of illustration, present patent document relates to novel methods for the identification and related filtering of variable-length, multi-layer encapsulated protocol data packets in computer network systems. Previous solutions for such identification and related filtering have relied upon using numerous flat filters that each identify a predefined combination of protocols of interest. In many situations, due to the large number of flat filters that may be required, hardware resources can be prohibitively expensive and, as such, providing them impractical.

In the following detailed description and in the several figures of the drawings, like elements are identified with like reference numerals.

1. Introductory Comments:

In representative embodiments, the present patent document discloses techniques for using a protocol identification apparatus in stages to identify and filter computer network protocol data units. In the first stage, the apparatus identifies, via the matching of a set of potential protocol bit patterns with the bits of the protocol data unit, the protocol used for a selected layer of encapsulation. The apparatus then attempts to identify the next layer of encapsulation to select via a similar matching with a second set of protocol bit patterns, via information coded into the previous encapsulation protocol, via best guesses encoded into the apparatus based on previous matches, or user guesses encoded into the apparatus. The process then continues until all layers of encapsulation that the user is interested in have been identified. Each such pattern can be of differing lengths. However, once an encapsulation for any given protocol encapsulation layer has been identified, the apparatus knows how far into the protocol data unit to index in order to begin searching for the next protocol pattern. This process can be repeated as many times as needed, within the constraints of a given implementation.

A table look-up method is used so that a number of patterns for any given protocol layer can be easily looked up in parallel and compared. Since the apparatus knows where in the protocol data unit the end of the last matched protocol pattern occurred, it knows where to begin the next pattern matching attempt.

The techniques disclosed utilize the concept of stages. Within each stage, the apparatus attempts to find a pattern match between the protocol data unit bits and the predefined pattern bits for a single layer of protocol encapsulation. Once found the apparatus resets itself and begins the search anew for the next layer of encapsulation.

In representative embodiments, the techniques disclosed can be thought of as searching a protocol data unit in stages. Each stage typically has a number pre-assigned to it. The search of the protocol data unit begins, for example, in stage number 0, and as the search by that stage is completed, a new stage is selected based on the results of the current stage search. This process continues until the end of the protocol data unit is reached, or it is determent that no further searching of the protocol data unit is needed.

The bytes of the protocol data unit are searched starting, for example, with byte 0. The stage can be thought of as consuming bytes of the protocol data unit until a pattern is found which causes the stage to end. The next stage then begins consuming bytes where the last stage ended. An optional performance enhancement can be made to this procedure by skipping bytes that do not need to be matched in the pattern. The bytes to be skipped are pre-programmed into a table that is then used by the system to skip the unneeded bytes.

In representative embodiments, the method and apparatus employed for protocol pattern searches at any given stage is used over and over again for each successive stage search. A pre-programmed "pattern lookup table" is used to determine if a particular encapsulation is present in a particular part of a protocol data unit for the current stage. A section of the pattern lookup table, that has been pre-programmed for the current stage number and protocol data unit byte number being searched, are indexed into. In a representative example, this section of the "pattern lookup" table has 256 entries in it, one for each possible value of the current byte of the protocol data unit. The entry corresponding to the actual value of the current byte of the protocol data unit is read from the table. The value that is read from the pattern lookup table is then AND accumulated into the stage accumulator, which is typically initialized to all ones at the beginning of the stage.

Each bit of this stage accumulator value has a pattern number assigned to it. A pattern is considered to be found if its stage accumulator bit is set and the stage has searched far enough into the protocol data unit to match the whole pattern, as determined from pre-programmed values in an "entry list", which causes a "stage pattern found bit" to be set. In a representative example, the entry list has one entry per pattern comparison that provides information as for example the next skip value and the last pattern comparison for this stage. If a pattern has been found that has been designated to cause a transition to a new stage then the current stage ends, if not then the next pattern lookup table entry is read, assuming we have not reached the end of the protocol data unit.

Based on pre-programmed information regarding the patterns for the current stage, information can be output regarding, what protocol is found, what stage number to go to next, what pattern number (or numbers) are found that are to be used in forming the "stage group results", and in some cases what encapsulation follows the encapsulation just found. The stage group result is the result of the pattern matching for the stages completed. Typically the group result is a bit pattern with a 0 in a bit position representing each preselected group of search patterns for each stage unless a match has been found for that preselected group of search patterns in which case a 1 is placed in the corresponding bit position. The group result can be used to determine whether or not the protocol data unit matches a preselected group of protocols.

When each stage search ends, the bits indicating which patterns were found for the stage are mapped into a "stage group result". This mapping is accomplished by using a number of pre-programmed tables which are referred to herein as clique maps. Each clique map is indexed into based on the current stage number and the bits of the stage patterns found bits assigned to the clique map. Optionally the index into the clique map can additionally be based on a "time slice number", if the number of "stage group result bits" needed is greater than the width of the clique map. The time slice number is used to access more than one map when more bits are needed than can be provided by one map. In a representative example, three maps of 16 bits each are accessed to obtain one output of 48 bits.

The number of stage accumulator result bits assigned to each clique map is a speed verses memory usage trade-off. For a 32 pattern matcher hardware implementation 2 or 3 bits would typically be used, for a 64 pattern matcher software implementation 8 bits would typically be a good choice. Likewise the width of the clique map is typically a speed verses memory usage trade-off.

The value obtained from each of the clique maps is OR'd together to form a "stage group results value". Some of the bits from this stage group results can be optionally used to generate any number of stage output results, although other methods can be used to generate the stage outputs. Also, the remaining stage group results bits are used to form a "stage group filter result". The stage group filter result is AND accumulated into the group accumulator, which is initialized to all ones at the beginning of a search of a protocol data unit. Each bit of this group accumulator value has a "group filter number" assigned to it.

A group filter is specified as a preselected set of stages satisfied and within each specified stage only one of the specified patterns for that stage would be found for the stage to be satisfied. On completion of the search of a protocol data unit, a group filter is considered to be found if its group accumulator bit is set and the appropriate stages have searched the protocol data unit. As the result of finding a group filter one or more actions can be taken, as would be the case with a conventional filter design, such as counting, saving the protocol data unit, discarding the protocol data unit, starting or stopping the capture of data, as well as other actions.

In a representative example, the apparatus can support up to 64 different encapsulations at one protocol layer, and up to fourteen protocol layers. This would be the equivalent of 64$^{14}$ flat filters. The equivalent number of flat filters for the apparatus is a limit imposed by the implementation. It is not a limit of the invention. The apparatus can be implemented functionality in hardware or software.

Techniques disclosed herein provide the ability to let the user look for something in a higher layer protocol without having to know anything about what lower layer protocols are being used. Also, by informing the apparatus regarding the encapsulation patterns desired, it can identify the encapsulation in the protocol data unit at runtime, which saves additional software routines from spending time identifying the encapsulations in each packet later. Both hardware and software implementations of this apparatus provide for very fast identification of the protocol data units.

In a typical network situation, there could be data flowing between literally hundreds of different nodes of which the user may be interested in capturing data from only two of these. Due to the speed of modern networks and the limited memory space of typical modern network analyzers, the buffer space allocated for protocol data unit capture can be quickly overrun. In previous systems, the majority of the protocol data units captured could be from nodes for which the user has no interest. As an example, if the user knows the internet protocol (IP) address of two nodes of interest and he would like to only capture data between these two nodes, previously unless he had detailed knowledge of the network it would be impossible for him to identify the IP addresses in the protocol data units as he would have to have at his disposal the numerous flat filters mentioned above. However, with the capabilities of the various stages of identification of the present apparatus, he would be able to filter out those protocol data units of interest with only minor additional effort beyond that required for protocol identification.

Figure 1:
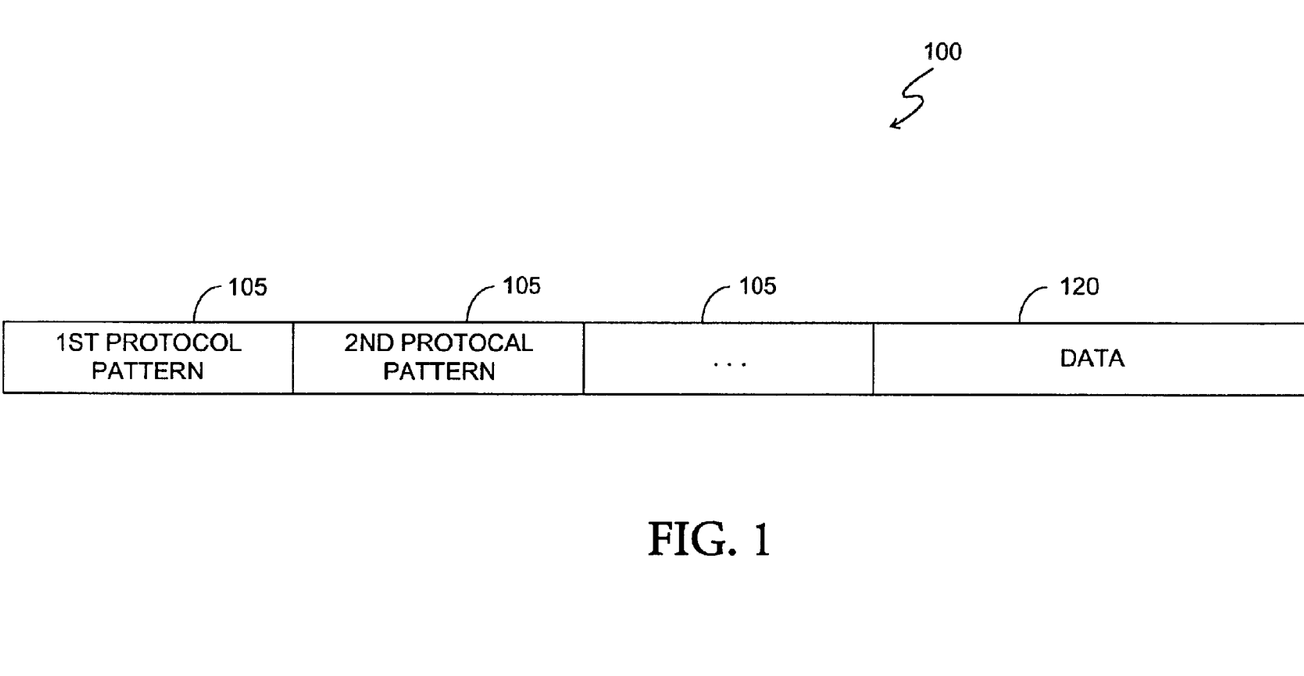
FIG. 1 is a drawing of a protocol data unit as described in various representative embodiments of the present patent document.

2. Methods for PDU Identification:

FIG. 1 is a drawing of a protocol data unit 100 as described in various representative embodiments of the present patent document. The protocol data unit 100 comprises bits of data 120 and one or more packet protocol patterns 105, also referred to herein as encapsulation protocol patterns 105 and as computer network protocols 105, which identify the protocols used in computer networks to encapsulate data. The packet protocol patterns 105 are defined by the layer of encapsulation and the particular protocols used to compose the protocol data unit 100. FIG. 1 is for illustrative purposes only. The protocols can be of varying lengths and will not necessarily be in the position within the protocol data unit shown in FIG. 1.

Figure 2:
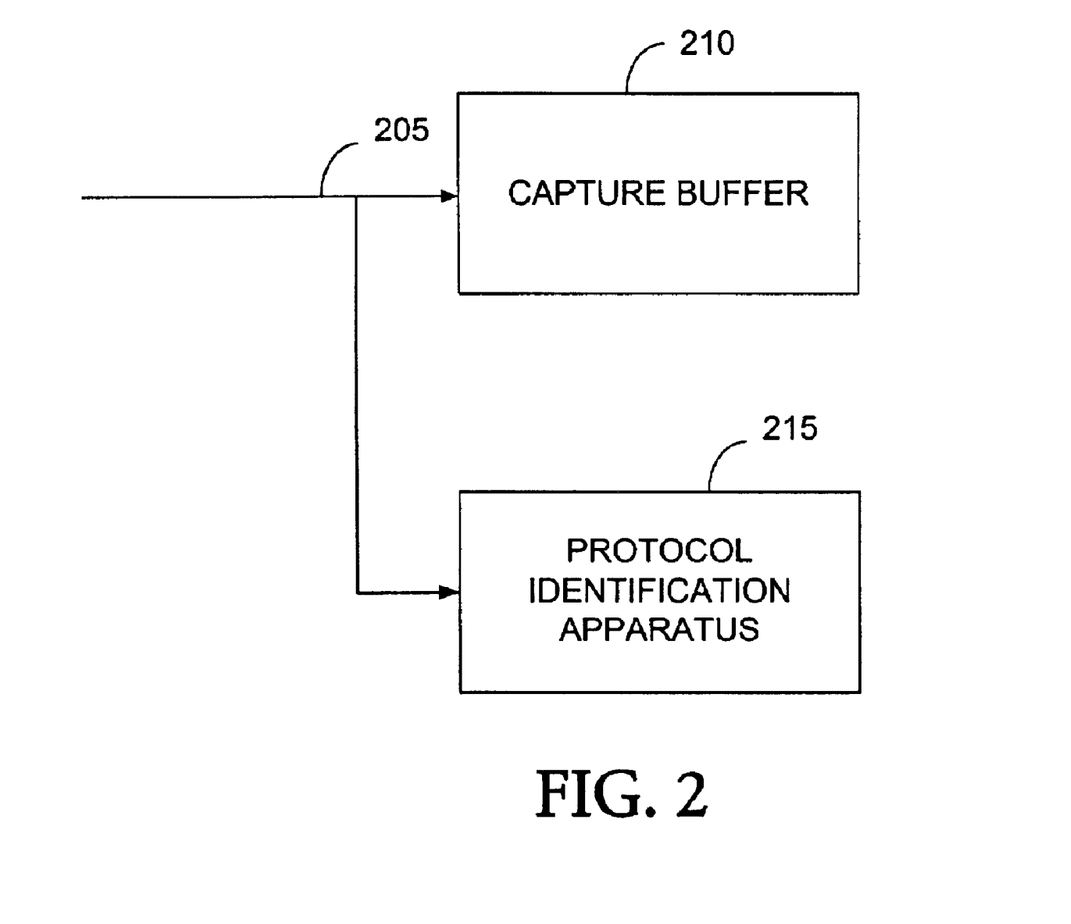
FIG. 2 is a drawing of protocol data unit capture as described in various representative embodiments of the present patent document.

FIG. 2 is a drawing of protocol data unit 100 capture as described in various representative embodiments of the present patent document. In FIG. 2, the protocol data unit 100 is received on a receive bus 205, written into a capture buffer 210, also referred to herein as a buffer 210, and received by a protocol identification apparatus 215. In an alternative representative embodiment, the protocol data unit 100 is received on receive bus 205 by the protocol identification apparatus 215 which in turn transfers the protocol data unit 100 to the capture buffer 210.

Figure 3A:
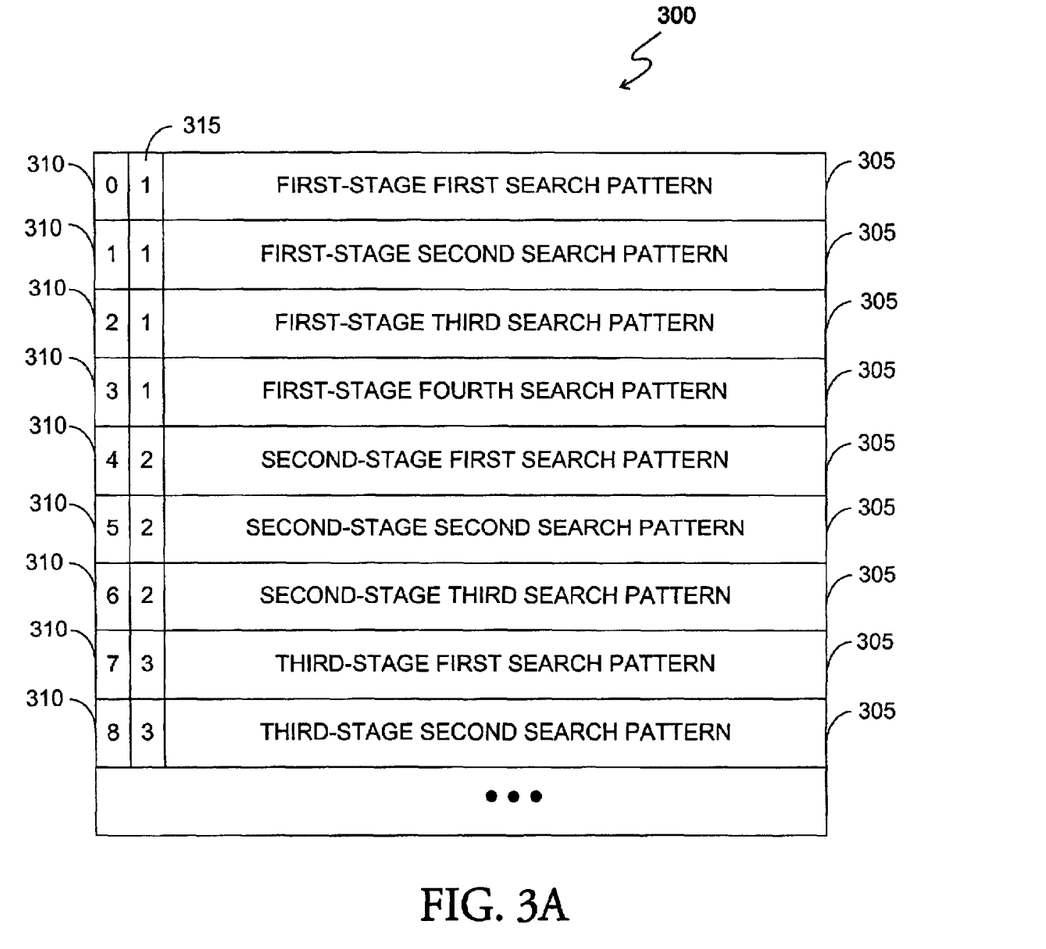
FIG. 3A is a drawing of a first list as described in various representative embodiments of the present patent document.
Figure 3B:
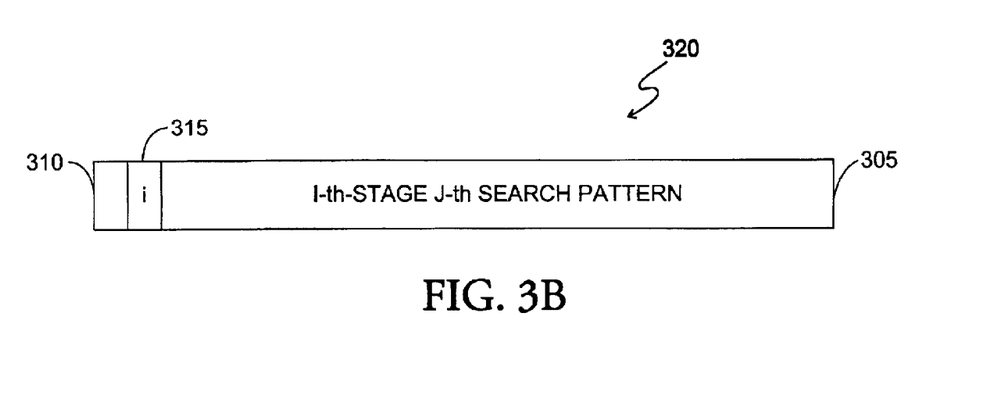
FIG. 3B is a drawing of an entry of the first list as described in various representative embodiments of the present patent document.

FIG. 3A is a drawing of a first list 300 as described in various representative embodiments of the present patent document. FIG. 3B is a drawing of an entry 320 of the first list 300 as described in various representative embodiments of the present patent document. The first list 300 is a list of search patterns 305 and is also referred to herein as the search pattern list 300. As shown in FIG. 3B, any given entry 320 of the search pattern list 300 comprises a search pattern index 310, a stage number 315, and the search pattern 305. The search pattern index 310 is an index which identifies the entry 320. It is typically an integer. In this example the search pattern index 310 identifies search pattern 305 entries beginning with 0 for the first entry, 1 for the second entry, 2 for the third entry, etc. The stage number 315 identifies the stage 315 that will be used to search for the search pattern 305. While it is recognized that the stage number 315 and the stage 315 itself, which is not specifically shown in any of the figures, are not the same entity, they are both referred to herein using the same identifying numeral (315) as the stage number 315 is used to identify the stage 315 being referred to.

As an example in FIG. 3A, the seventh entry 320 in the search pattern list 300 has its search pattern index 310 equal to 6 indicating that it is the seventh entry in the list. This entry 320 also comprises the second-stage third search pattern 305. The second-stage third search pattern 305 has the number of its stage 315 equal to two indicating that it is a search pattern 305 associated with the second stage. In this representative example, the protocol identification apparatus 215 attempts to match search patterns 305 with the packet protocol patterns 105 found in any given protocol data unit 100. In particular for the example represented by FIG. 3A assuming that the apparatus 215 will attempt to find a match for all stages, the protocol identification apparatus 215 will attempt to match first-stage first search pattern 305, first-stage second search pattern 305, first-stage third search pattern 305, and first-stage fourth search pattern 305 with the first protocol pattern 105 of the protocol data unit 100 being analyzed. Similarly, the protocol identification apparatus 215 will attempt to match second-stage first search pattern 305, second-stage second search pattern 305, and second-stage third search pattern 305 with the second protocol pattern 105 of the protocol data unit 100 being analyzed. In like manner, the protocol identification apparatus 215 will attempt to match the third and any other search patterns 305 for other stages with the corresponding protocol pattern 105 of the protocol data unit 100 being analyzed. The three ellipses shown in FIG. 3A represent any additional search patterns 305 that may be encoded into the search pattern list 300. Within the constraints of the apparatus, the number of patterns for each layer, as well as the number of stages to be searched is typically specified by the implementor and can be varied based on the user's needs. The maximum allowed number of patterns for each layer, as well as the number of stages to be searched, is as previously stated implementation dependent.

Figure 3C:
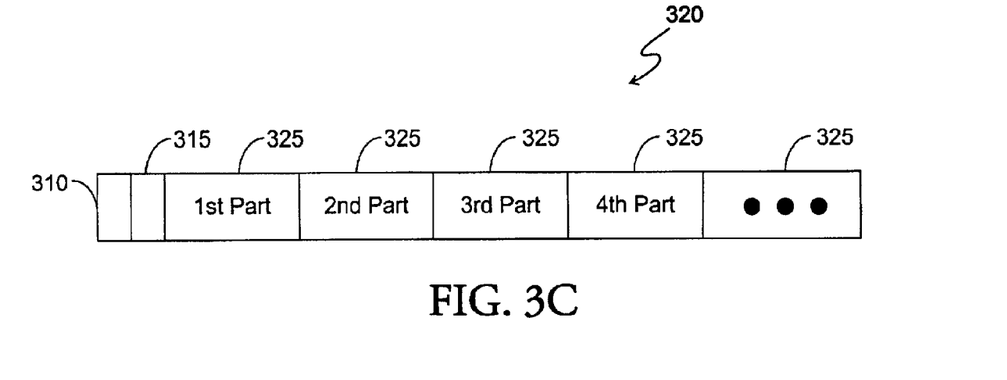
FIG. 3C is another drawing of an entry of the first list as described in various representative embodiments of the present patent document.

FIG. 3C is another drawing of an entry 320 of the first list 300 as described in various representative embodiments of the present patent document. In an alternative embodiment, successive parts 325 of the search pattern 305 are selected from the search pattern 305 and searches of the protocol data unit 100 are successively conducted to find them. As an example, a first part 325 of the search pattern 305 is first selected and the protocol data unit is searched for it. Then a second part 325 of the search pattern 305 is first selected and the protocol data unit is searched for it. This process continues until all parts 325 of the search pattern 305 have been selected and searches conducted. Alternatively, if a particular part 325 fails to match the protocol data unit 100, the search for that search pattern 305 is terminated.

Figure 4:
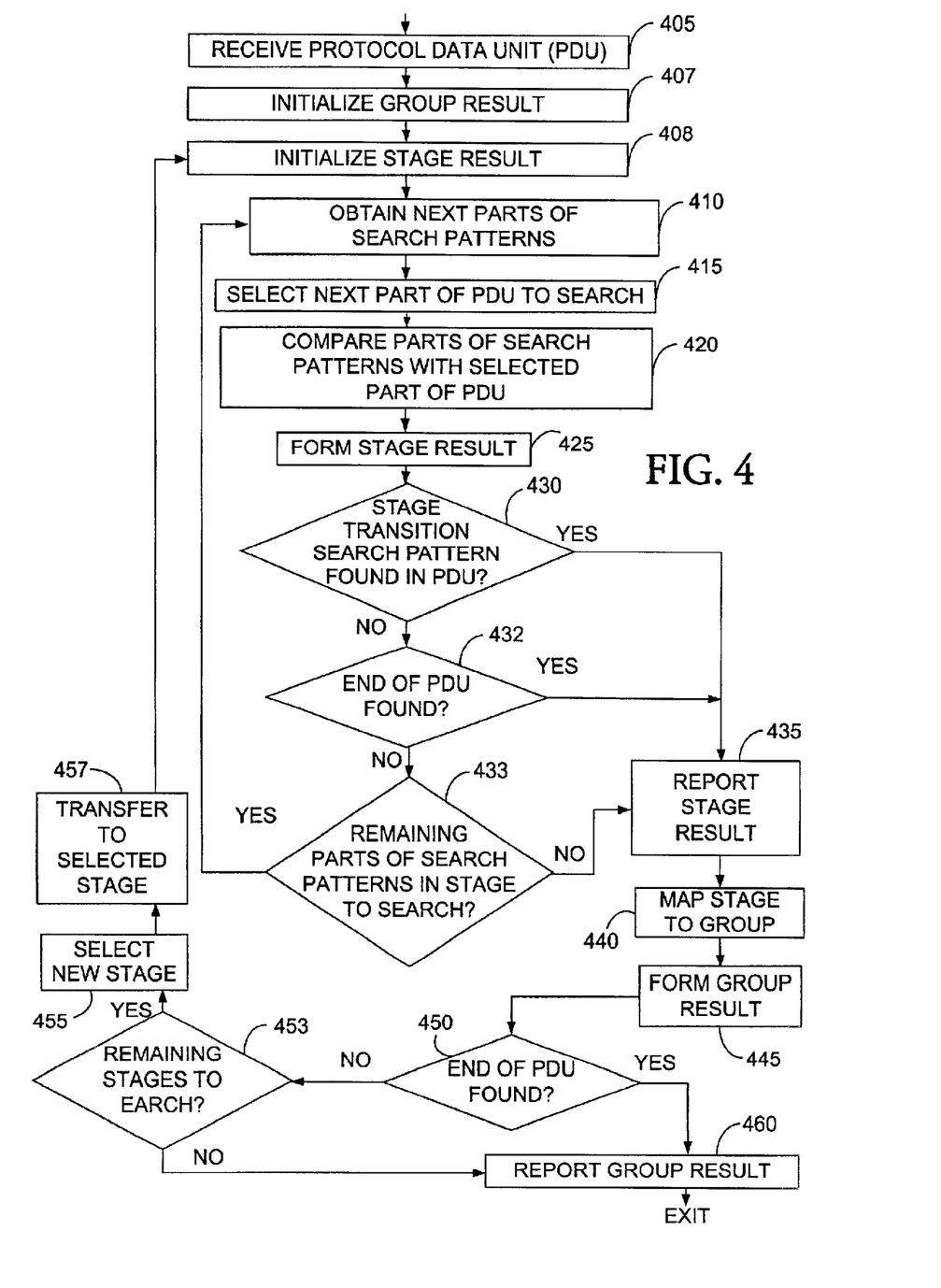
FIG. 4 is a flow chart of a method for identification of protocol data units as described in various representative embodiments of the present patent document.

FIG. 4 is a flow chart of a method for identification of protocol data units 100 as described in various representative embodiments of the present patent document. In block 405, a protocol data unit 100 is received. The protocol data unit 100 is typically written into the capture buffer 210 and in parallel captured by the protocol identification apparatus 215 as shown in FIG. 2. After the protocol identification apparatus 215 receives the protocol data unit 100, block 405 will select the starting stage which would typically be stage number 0 and initialize a pointer into the protocol data unit 100 which would typically be the first byte of the protocol data unit 100. Block 405 then transfers control to block 407.

In block 407, the group result is initialized. The group result is the result of the pattern matching for all stages completed. Typically the group result is a bit pattern with a 0 in a bit position representing each preselected group of search patterns 305 for each stage unless a match has been found for that preselected group of search patterns 305 in which case a 1 is placed in the corresponding bit position. The group result can be used to determine whether or not the protocol data unit 100 matches a preselected group of protocols. If a match has been found in a representative embodiment, a pointer in the capture buffer 210 is moved so that the present protocol data unit 100 remains in the capture buffer 210. If, however, a match is not found, the next protocol data unit 100 received overwrites the present protocol data unit 100. Block 407 then transfers control to block 408.

In block 408, the stage result is initialized. The stage result is the result of the patterns matching for the stage. Typically this result is a bit pattern with a 0 in a bit position representing each search pattern 305 associated with the active stage wherein there is not a match and a 1 wherein there is a match. Block 408 then transfers control to block 410.

In block 410, the protocol identification apparatus 215 obtains the next portion of one or more search patterns 305 via entries in the search pattern list 300 for the current stage. The matching process is more efficiently performed by attempting to match portions of multiple search patterns 305 simultaneously. Block 410 then transfers control to block 415.

In block 415, the pointer into the protocol data unit 100 may be advanced a number of bytes if a non-zero skip value has been assigned to this part 325 of the search patterns 305, which typically for the first comparison of the first stage is zero. Typically for subsequent comparisons, the skip value is obtained from a table that has been pre-programmed based on knowledge of all of the bytes that are needed by the search patterns 305 to identify the encapsulations for the current stage 315. Optionally all bytes of the protocol data unit 100 could be compared if time permits. Block 415 then transfers control to block 420.

In block 420, the parts 325 of the search patterns 305 are compared with the protocol data unit 100 in order to determine if a pattern within the protocol data unit 100 matches that of the search pattern 305 with the pointer into the protocol data unit 100 being advanced as needed. Block 420 then transfers control to block 425.

In block 425, the stage result to that point in the stage is formed. Block 425 then transfers control to block 430.

When one of the search patterns 305 that has been designated to end the stage is found to match a pattern in the protocol data unit 100, block 430 transfers control to block 435. Those search patterns which are designated to end a particular stage, when found, are referred to as "stage transition search patterns". Otherwise, block 430 transfers control to block 432.

When the end of the protocol data unit 100 has been encountered, block 432 transfers control to block 435. Otherwise, block 432 transfers control to block 433.

When there are remaining parts 325 of one or more search patterns 305 in the present stage for which a search needs to be performed in the protocol data unit 100, block 433 transfers control to block 410. Otherwise, block 433 transfers control to block 435.

In block 435, the stage result is reported. Block 435 then transfers control to block 445.

In block 445, the group result for all stages completed is formed. Block 445 then transfers control to block 450.

When the end of the protocol data unit 100 has been encountered, block 450 transfers control to block 460. Otherwise, block 450 transfers control to block 453.

When there are remaining stages comprising search patterns 305 for which a search needs to be made in the protocol data unit 100, block 453 transfers control to block 455. Otherwise, block 453 transfers control to block 460.

In block 455, a new stage is selected for which attempts will be made to match search patterns 305 with the packet protocol pattern 105 in the protocol data unit 100. Block 455, then transfers control to block 457.

In block 457, the process transfers to the selected stage. Block 457 then transfers control to block 408.

In block 460, the group result is reported. Block 460 then exits the process.

Figure 5:
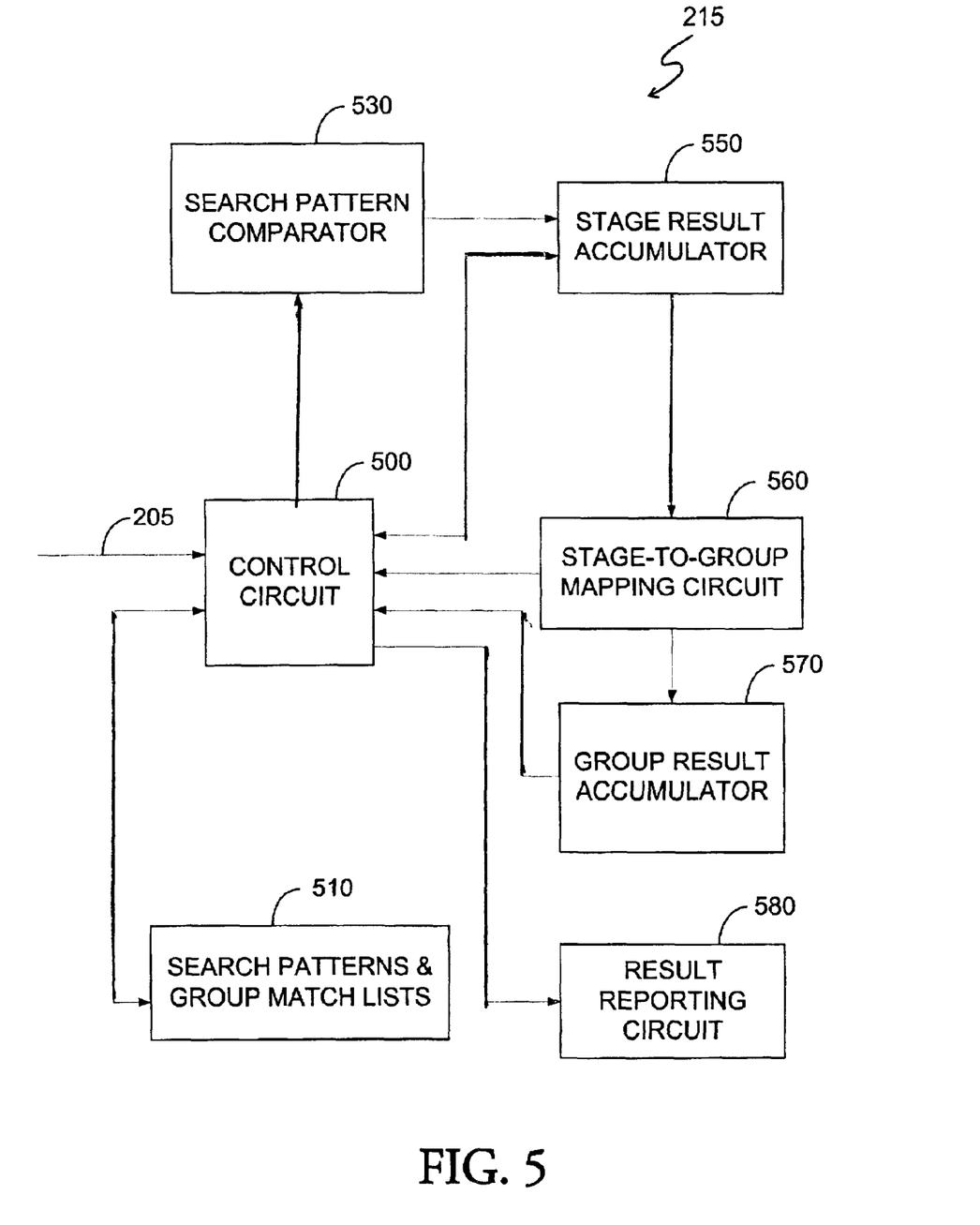
FIG. 5 is a drawing of a protocol identification apparatus for identification of protocol data units as described in various representative embodiments of the present patent document.

3. Apparatus for PUD Identification:

FIG. 5 is a drawing of the protocol identification apparatus 215 for identification of protocol data units 100 as described in various representative embodiments of the present patent document. In FIG. 5, data is received on receive bus 205 by a control circuit 500. As previously described and as shown in FIG. 2, the protocol data unit 100 is also written in a parallel process in a representative embodiment into the capture buffer 210. The protocol identification apparatus 215 identifies the packet protocol patterns 105 in protocol data units 100 and, based upon the results of the identification process, filters out those protocol data units 100 which will not remain in the capture buffer 210. The capture buffer 210 could be, for example, a first-in-first-out (FIFO) buffer. Based upon the contents of the search pattern list 300, the control circuit 500 determines on which of the bytes in the protocol data unit 100 an attempt will be made to match search patterns 305. As previously described, the search pattern list 300 comprises the search patterns 305 for which the user desires to obtain matches. The control circuit 500 obtains this information from lists, tables, and/or databases and/or the like which is shown in FIG. 5 as search patterns & group match lists 510.

During the first stage of pattern matching, the protocol data unit 100 and the search patterns 305 upon which a search is planned are passed to a search pattern comparator 530, also referred to herein as a first comparator 530 and a pattern comparator 530. The control circuit 500 indexes into the protocol data unit 100 as previously described.

Any given stage can have various search patterns 305 that have differing bit pattern lengths. But since the protocols are of variable lengths, the user does not know where the next protocol or the next packet protocol pattern will begin. Once the packet protocol pattern 105 that has been designated as a stage transition pattern has been identified for a given encapsulation layer, the stage portion of the apparatus is reset for the stage number that is designated for the stage transition pattern just found and the process begins all over again looking for the packet protocol pattern 105 for the next layer of encapsulation.

In a representative embodiment, the search pattern comparator 530 is a 32 bit wide RAM 530 having the capability of matching 32 different search patterns 305 simultaneously with the protocol data unit 100. From the 32 bit wide RAM 530 a bit pattern indicating which, if any, search pattern 305 matched the corresponding packed protocol pattern 105 with which the protocol data unit 100 was encapsulated is transmitted to the stage result accumulator 550, also referred to herein as a first accumulator 550, which creates an indicator, not specifically shown in the figures, as to whether or not the search pattern 305 is found in the protocol data unit 100. If, for example, match bit 31 is set to a "1" then pattern number 31 that we were looking for matches. A "0" indicates that did not match. Should the comparison be performed more than once for each stage, the stage result accumulator 550 is updated following the completion of individual or simultaneous comparison. The result contained in the stage result accumulator 550 is transmitted to the control circuit 500 and to a stage-to-group mapping circuit 560, also referred to herein as a mapping circuit 560, where the stage results are mapped and transmitted on to a group result accumulator 570, also referred to herein as a second accumulator 570, which creates an indicator, not specifically shown in the figures but referred to as group indicator 570, as to whether or not a preselected group of search patterns 305 is found in the protocol data unit 100. Output from the stage-to-group mapping circuit 560 are also transmitted to the control circuit 500 where they are used to provide stage results such as the next stage number, the next protocol ID, the location to write the next protocol ID, as well as other items. The group result accumulator 570 transfers the group result to the control circuit 500. Following completion of a given stage, the control circuit 500 resets the stage result accumulator 550 to its initial settings.

There could be 32 patterns that could be matched at any given stage. For a given byte of the protocol data unit 100 there could be multiple values that satisfy one or more of the patterns being looked for. That byte could index any one of 256 words in our RAM. So the RAM is programmed for all 256 locations indexed by a given byte of data. If the byte value is "0", the RAM is programmed at entry 0 to the match bits for whatever patterns we may be looking for. If the byte value is a "1" that is a different word in the RAM so that word is programmed with the match bits the way we want the match bits to come out. So, doing a lookup on a single byte is looking for a pattern that could be any set of those 265 values. It is up to the implementer to insure that the RAM has been programmed to choose whichever of the 256 values match the patterns that are of interest.

The user may be interested in finding several different types of protocol encapsulations and identify them as a single group of protocols, which could be for example Frame Relay followed by RFC 1490 followed by IP. He may want to count the occurrences of different groups of patterns. Another purpose of the stage-to-group mapping circuit 560 is in identifying which stage to investigate next. As an example, the protocol data unit 100 may be identified as a frame relay encapsulation during the $1^{st}$ stage, and the system may then be programmed to use the $4^{th}$ stage to determine if the next encapsulation is RFC 1490 or an encapsulation for some other protocol which could be, for example, LMI.

The protocol identification apparatus 215 can maintain a count of the total number of packets that have matched each search pattern 305 for each encapsulation layer. In addition, the protocol identification apparatus 215 is used to create the traditional filter functions of controlling the data capture (start, center, halt, store, suppress), as well as counting. Any pattern of protocols, whether singular or in combination, that the protocol data unit 100 satisfies can, at the users option, cause a flag to be set and/or a parameter defined for that pattern to be incremented or otherwise a record to be made of the fact that a match was found. Such information may, for example, be recorded in the overhead area of the buffer that is associated with the protocol data unit 100. Also, any stage can optionally cause values to be written to one of a number of locations in the overhead area of the buffer that is associated with the protocol data unit 100 to indicate where that stage's encapsulation starts in the protocol data unit 100 and which protocol was found for that stage. In addition, the protocol identification apparatus 215 can be used to, auto-detect which protocols are being used on a network, provide encapsulation information that can be used to decode the protocol data units 100, and prioritize packets for runtime processing.

The control circuit 500 transfers various results of interest, as for example those discussed above, to a result reporting circuit 580 for use in relaying those results to other circuits and functions.

As is the case, in many data-processing products, techniques disclosed herein may be implemented as a combination of hardware and software components. Moreover, the functionality required for using the invention may be embodied in computer-readable media, such as hard disks, floppy disks, CD ROMs, DVD ROMs, and the like, to be used in programming an information-processing apparatus, e.g., a network analyzer, a server computer, or a personal computer to perform in accordance with the techniques disclosed herein.

While the techniques described herein can advantageously be used in protocol analyzers, they can also be used in other devices capable of receiving protocol data units 100 such as computers.

4. Concluding Remarks:

A primary advantage of the embodiment as described in the present patent document over prior is the dramatic reduction in the large number of pattern comparators required to search for a match with the packet protocol patterns 105 of the protocol data unit 100. This reduction is provided via the utilization of the concept of stages. An additional advantage is the ability to look for a particular pattern in a higher layer protocol without having knowledge of which lower layer protocols are being used. Also, both hardware and software implementations of this apparatus provide the advantage of very fast identification of the protocol data units. Another advantage is the ability to provide information about what encapsulations are present in a particular protocol data unit 100 thus saving software routines time when they process each packet later. And finally, by informing the apparatus 215 regarding the encapsulation patterns desired, the protocol identification apparatus 215 can filter the protocol data unit 100 at runtime which provides the advantages of saving additional software routines from spending time later processing packets that are not needed and valuable capture buffer space by discarding those protocol data units 100 not of interest.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A method for identifying computer network protocols used to encapsulate data in a protocol data unit, which comprises the steps of:

receiving the protocol data unit, wherein the protocol data unit comprises data and multiple encapsulation protocol patterns; and while there remains at least one stage for which the protocol data unit is to be searched, iteratively performing:

selecting one of the remaining stages, and while there remains at least one search pattern of the selected stage for which the protocol data unit is to be searched, iteratively performing:

selecting one of the remaining search patterns, and searching the protocol data unit for the selected search pattern.

2. The method as recited in claim 1, which further comprises the steps of:

prior to the while there remains at least one stage iterative loop:

assigning a group indicator for at least one pre-defined group of search patterns, wherein the group comprises at least one sub-set which comprises at least one preselected search pattern, wherein the preselected search pattern identifies at least one preselected network protocol used to encapsulate data; and initializing the group indicator to specify that at least one sub-set is present in the expected locations in the protocol data unit; and after the while there remains at least one search pattern of the selected stage for which the protocol data unit is to be searched iterative loop:

when all search patterns associated with each sub-set of the group for the selected stage are absent from the expected locations in the protocol data unit, setting the group indicator to specify that all sub-sets of that group are absent from the protocol data unit.

3. The method as recited in claim 2, which following the method step searching the protocol data unit for the selected search pattern further comprises the step of:

after the while there remains at least one stage iterative loop:

when at least one of the sub-sets is present in the expected locations in the protocol data unit, placing the protocol data unit in a buffer.

4. The method as recited in claim 1, wherein the method step searching the protocol data unit for the selected search pattern comprises the steps of:

while there remains at least one part of the search pattern of the selected stage for which the protocol data unit is to be searched, iteratively performing:
  selecting one of the remaining un-searched parts of the selected search pattern, and
  searching the protocol data unit for the selected part of the selected search pattern.

5. The method as recited in claim 4, which further comprises the steps of:
  when the method step searching the protocol data unit for the selected part of the selected search pattern fails to find the selected part in the protocol data unit,
    exiting the while there remains at least one part of the search pattern of the selected stage for which the protocol data unit is to be searched iterative loop and
    exiting the while there remains at least one search pattern of the selected stage for which the protocol data unit is to be searched iterative loop.

6. The method as recited in claim 1, which following the method step selecting one of the remaining search patterns further comprises the steps of:
  when there remains at least one additional search pattern of the selected stage for which the protocol data unit is to be searched,
    selecting at least one of the additional remaining search patterns, and
    in parallel with the method step of searching the protocol data unit for the selected search pattern, searching the protocol data unit for the additional selected search pattern.

7. The method as recited in claim 6, wherein the parallel method steps of searching the protocol data unit for the selected search pattern and of searching the protocol data unit for the additional selected search pattern comprise the steps of:
  while there remains at least one part of the selected search pattern of the selected stage for which the protocol data unit is to be searched and at least one part of the additional selected search pattern of the selected stage for which the protocol data unit is to be searched, iteratively performing:
    selecting one of the remaining un-searched parts of the selected search pattern,
    selecting one of the remaining un-searched parts of the additional selected search pattern,
    searching the protocol data unit for the selected part of the selected search pattern, and
    in parallel with the method step of searching the protocol data unit for the selected part of the selected search pattern, searching the protocol data unit for the selected part of the additional selected search pattern;
  otherwise, while there remains at least one part of the selected search pattern of the selected stage for which the protocol data unit is to be searched, iteratively performing:
    selecting one of the remaining un-searched parts of the selected search pattern, and
    searching the protocol data unit for the selected part of the selected search pattern; and
  otherwise, while there remains at least one part of the additional selected search pattern of the selected stage for which the protocol data unit is to be searched, iteratively performing:
    selecting one of the remaining un-searched parts of the additional selected search pattern, and
    searching the protocol data unit for the selected part of the additional selected search pattern.

8. The method as recited in claim 7, which further comprises the steps of:
  when the method step searching the protocol data unit for the selected part of the selected search pattern fails to find the selected part of the selected search pattern in the protocol data unit and when the parallel method step of searching the protocol data unit for the selected part of the additional selected search pattern fails to find the selected part of the additional selected search pattern in the protocol data unit,
    exiting the while there remains at least one part of the selected search pattern of the selected stage for which the protocol data unit is to be searched and at least one part of the additional selected search pattern of the selected stage for which the protocol data unit is to be searched iterative loop;
  otherwise when the method step searching the protocol data unit for the selected part of the selected search pattern fails to find the selected part of the selected search pattern in the protocol data unit,
    exiting the while there remains at least one part of the selected search pattern of the selected stage for which the protocol data unit is to be searched iterative loop; and
  otherwise when the method step searching the protocol data unit for the selected part of the additional selected search pattern fails to find the selected part of the additional selected search pattern in the protocol data unit,
    exiting the while there remains at least one part of the additional selected search pattern of the selected stage for which the protocol data unit is to be searched iterative loop.

9. A storage medium readable by a protocol identification apparatus, tangibly embodying a computer program of instructions executable by the protocol identification apparatus to perform method steps for identifying computer network protocols used to encapsulate data in a protocol data unit, the steps comprising:
  receiving the protocol data unit, wherein the protocol data unit comprises data and multiple encapsulation protocol patterns; and
  while there remains at least one stage for which the protocol data unit is to be searched, iteratively performing:
    selecting one of the remaining stages, and
    while there remains at least one search pattern of the selected stage for which the protocol data unit is to be searched, iteratively performing:
      selecting one of the remaining search patterns, and
      searching the protocol data unit for the selected search pattern.

10. The storage medium as recited in claim 9, the steps further comprising:
  prior to the while there remains at least one stage iterative loop:
    assigning a group indicator for at least one pre-defined group of search patterns, wherein the group comprises at least one sub-set which comprises at least one preselected search pattern, wherein the preselected search pattern identifies at least one preselected network protocol used to encapsulate data; and
    initializing the group indicator to specify that at least one sub-set is present in the expected locations in the protocol data unit; and after the while there remains at least one search pattern of the selected stage for which the protocol data unit is to be searched iterative loop:
when all search patterns associated with each sub-set of the group for the selected stage are absent from the expected locations in the protocol data unit, setting the group indicator to specify that all sub-sets of that group are absent from the protocol data unit.

11. The storage medium as recited in claim 10, wherein following the step searching the protocol data unit for the selected search pattern, the steps further comprising:
after the while there remains at least one stage iterative loop:
when at least one of the sub-sets is present in the expected locations in the protocol data unit, placing the protocol data unit in a buffer.

12. The storage medium as recited in claim 9, wherein the step searching the protocol data unit for the selected search pattern comprising the steps of:
while there remains at least one part of the search pattern of the selected stage for which the protocol data unit is to be searched, iteratively performing:
selecting one of the remaining un-searched parts of the selected search pattern, and
searching the protocol data unit for the selected part of the selected search pattern.

13. The storage medium as recited in claim 12, the steps further comprising:
when the method step searching the protocol data unit for the selected part of the selected search pattern fails to find the selected part in the protocol data unit,
exiting the while there remains at least one part of the search pattern of the selected stage for which the protocol data unit is to be searched iterative loop and
exiting the while there remains at least one search pattern of the selected stage for which the protocol data unit is to be searched iterative loop.

14. The storage medium as recited in claim 9, wherein following the method step selecting one of the remaining search patterns, the steps further comprising:
when there remains at least one additional search pattern of the selected stage for which the protocol data unit is to be searched,
selecting at least one of the additional remaining search patterns, and
in parallel with the method step of searching the protocol data unit for the selected search pattern, searching the protocol data unit for the additional selected search pattern.

15. The storage medium as recited in claim 14, wherein the parallel method steps of searching the protocol data unit for the selected search pattern and of searching the protocol data unit for the additional selected search pattern comprise the steps of:
while there remains at least one part of the selected search pattern of the selected stage for which the protocol data unit is to be searched and at least one part of the additional selected search pattern of the selected stage for which the protocol data unit is to be searched, iteratively performing:
selecting one of the remaining un-searched parts of the selected search pattern,
selecting one of the remaining un-searched parts of the additional selected search pattern,
searching the protocol data unit for the selected part of the selected search pattern, and
in parallel with the method step of searching the protocol data unit for the selected part of the selected search pattern, searching the protocol data unit for the selected part of the additional selected search pattern;
otherwise, while there remains at least one part of the selected search pattern of the selected stage for which the protocol data unit is to be searched, iteratively performing:
selecting one of the remaining un-searched parts of the selected search pattern, and
searching the protocol data unit for the selected part of the selected search pattern; and
otherwise, while there remains at least one part of the additional selected search pattern of the selected stage for which the protocol data unit is to be searched, iteratively performing:
selecting one of the remaining un-searched parts of the additional selected search pattern, and
searching the protocol data unit for the selected part of the additional selected search pattern.

16. The storage medium as recited in claim 15, the steps further comprising:
when the method step searching the protocol data unit for the selected part of the selected search pattern fails to find the selected part of the selected search pattern in the protocol data unit and when the parallel method step of searching the protocol data unit for the selected part of the additional selected search pattern fails to find the selected part of the additional selected search pattern in the protocol data unit,
exiting the while there remains at least one part of the selected search pattern of the selected stage for which the protocol data unit is to be searched and at least one part of the additional selected search pattern of the selected stage for which the protocol data unit is to be searched iterative loop;
otherwise when the method step searching the protocol data unit for the selected part of the selected search pattern fails to find the selected part of the selected search pattern in the protocol data unit,
exiting the while there remains at least one part of the selected search pattern of the selected stage for which the protocol data unit is to be searched iterative loop; and
otherwise when the method step searching the protocol data unit for the selected part of the additional selected search pattern fails to find the selected part of the additional selected search pattern in the protocol data unit,
exiting the while there remains at least one part of the additional selected search pattern of the selected stage for which the protocol data unit is to be searched iterative loop.

17. An apparatus for identifying those computer network protocols used to encapsulate data in a protocol data unit, comprising:
a control circuit, wherein the control circuit is capable of receiving the protocol data unit and is capable of obtaining at least one search pattern for each of multiple stages, wherein each search pattern identifies one of the network protocols used to encapsulate data; and
a pattern comparator, wherein the pattern comparator is connected to the control circuit, wherein the pattern comparator is capable of receiving the protocol data unit from the control circuit, wherein the control circuit is capable of successively selecting individual stages, and wherein for the selected stage the pattern comparator is capable of receiving at least one search pattern for the selected stage from the control circuit and of separately searching the protocol data unit for the received search pattern.

18. The apparatus as recited in claim 17, wherein the pattern comparator is capable of separately searching the protocol data unit for part of the received search pattern.

19. The apparatus as recited in claim 17, wherein the pattern comparator is capable of separately searching the protocol data unit for multiple received search patterns in parallel.

20. The apparatus as recited in claim 17, further comprising a first accumulator, wherein the first accumulator is connected to the pattern comparator and is capable of accumulating results from searches of the selected stage.

21. The apparatus as recited in claim 20, further comprising:
a mapping circuit, wherein the mapping circuit is connected to the first accumulator and wherein the mapping circuit maps the contents of the first accumulator against a preselected group of search patterns.

22. The apparatus as recited in claim 21, further comprising a second accumulator, wherein the second accumulator is connected to the mapping circuit and is capable of accumulating results from maps of the first accumulator for each stage against the preselected group of search patterns.

* * * * *